United States Patent [19]

Hansen

[11] 4,303,200
[45] Dec. 1, 1981

[54] ATOMIZER WHEEL FOR THE ATOMIZATION OF LIQUIDS

[75] Inventor: Ove E. Hansen, Vaerløse, Denmark

[73] Assignee: A/S Niro Atomizer, Søborg, Denmark

[21] Appl. No.: 112,672

[22] Filed: Jan. 16, 1980

[30] Foreign Application Priority Data

Jan. 19, 1979 [DK] Denmark .............................. 252/79

[51] Int. Cl.³ .............................................. B05B 3/10
[52] U.S. Cl. ................................... 239/223; 233/47 R
[58] Field of Search ............... 239/214, 222, 223, 224; 233/46, 47 R

[56] References Cited

U.S. PATENT DOCUMENTS

| 2,902,223 | 9/1959 | Nyrop | 239/223 |
| 2,920,830 | 1/1960 | Nyrop et al. | 239/224 X |
| 3,454,226 | 7/1969 | Nielsen | 239/224 |
| 3,640,467 | 2/1972 | Moller et al. | 239/224 |

FOREIGN PATENT DOCUMENTS 1111872  5/1968  United Kingdom ................ 239/224

Primary Examiner—Johnny D. Cherry
Attorney, Agent, or Firm—Sughrue, Mion, Zinn, Macpeak and Seas

[57] ABSTRACT

In an atomizer wheel for the atomization of liquids by ejection through a number of orifices in the side wall of the wheel, whipping-in of air into the atomized liquid is reduced by provision of a protrusion around the leading edge of each orifice relative to the direction of rotation, whereby the liquid flowing backwards relative to the side wall is guided outside the leading edge of the orifice to a liquid inlet passage at the rear part of the ejection orifice relative to the direction of rotation. The protrusion may be formed by a bushing inserted in the ejection orifice and projecting inwardly from the side wall, at the rear side of which relative to the direction of rotation the inlet passage is formed as a slit.

3 Claims, 3 Drawing Figures

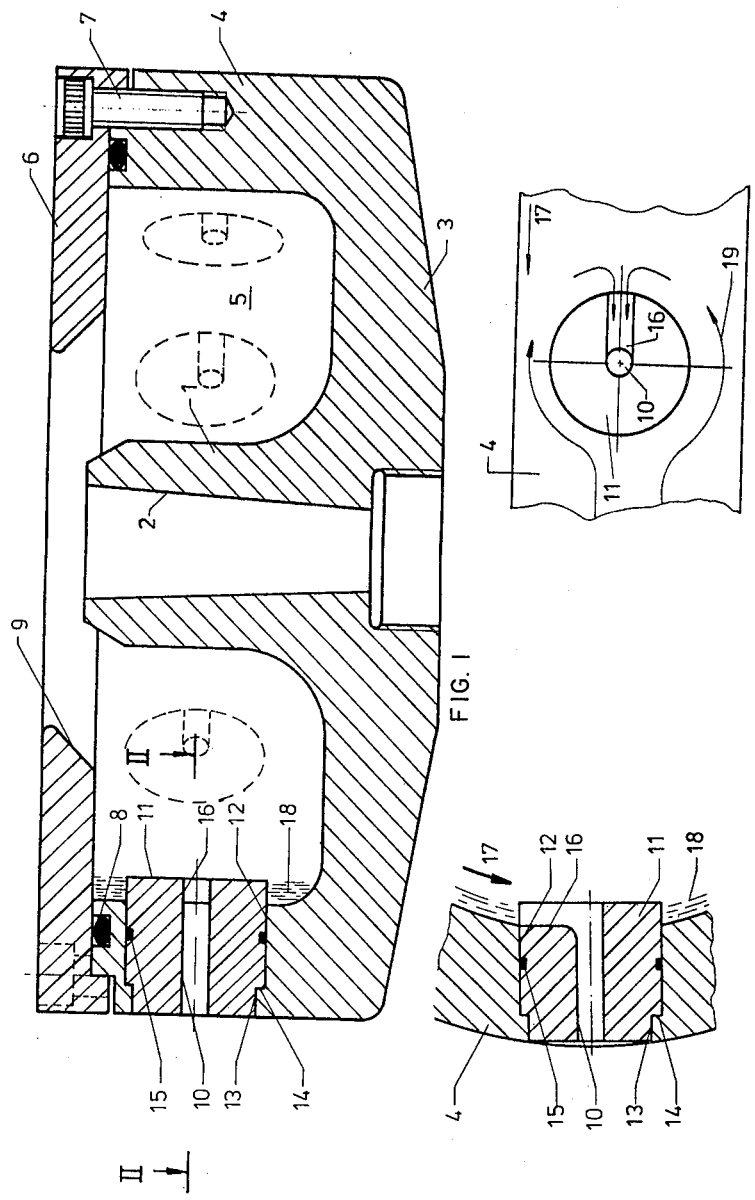

ATOMIZER WHEEL FOR THE ATOMIZATION OF LIQUIDS

The invention relates to an atomizer wheel for the atomization of liquids, comprising a hub secured to a rotating drive shaft, a wheel bottom connected with said hub and a cylindrical side wall connected with said wheel bottom and forming together with the wheel bottom and the hub a bowl-shaped liquid supply chamber, the upper part of which communicates with an inlet for liquid to be atomized, at least one row of ejection orifices for atomized liquid being formed in said side wall.

In the use of atomizer wheels of this kind in the atomization of liquid that forms part of a spray drying process for powder production, the problem occurs with some materials that quite considerable amounts of air may be whipped into the liquid, that is influenced by rotational and centrifugal forces in the atomizer wheel, as a result of which a great content of air in the form of occluded air in the powder particles will also appear in the finished powder product. Thereby, the product will attain a low bulk density giving rise to a high consumption of packing material and relatively great demands for transport and storage space. Moreover, the voluminous structure of such a powder product results in a particular liability to detrimental environmental influences, particularly in the form of oxidation and absorption of humidity, in addition to which the occluded air may in itself give rise to harmful oxidation.

In the past, various measures have been suggested for reduction of occlusion of air in the liquid in the atomizer wheel. Thus, in British Patent specification No. 712,823 and Danish Patent specification No. 76,954, a particular centrifugation prior to the atomization is prescribed, which requires a complicated construction of the atomizer wheel, and in order to avoid air occlusion it is known from British Patent specification No. 1,439,540 to impart a temperature to the liquid supplied to the atomizer wheel, at which a strong degasification, possibly boiling, takes place inside the atomizer wheel itself.

It is the object of the present invention to avoid or reduce the occlusion or whipping-in of air into the atomized liquid without using such particular measures which either require a complicated and expensive atomizer wheel design or an increased energy consumption.

To accomplish this, the atomizer wheel according to the invention is characterized in that a protrusion is provided at the inner side of the side wall of the wheel around the leading edge of each ejection orifice relative to the direction of rotation, said protrusion guiding a liquid layer flowing backwards relative to the side wall around the leading edge of the orifice to a liquid inlet passage at the part of the ejection orifice facing backwards relative to the direction of rotation.

The invention is based on the recognition of the fact that the stream of liquid flowing through an ejection orifice or channel under the influence of the rotational and centrifugal forces in the form of a liquid layer flowing along the radial wall of the channel lying backwards relative to the direction of rotation is subjected to said whipping-in of air by impact of liquid droplets generated by atomization of part of the liquid flowing over the internal edge of the opposite radial wall lying foremost relative to the direction of rotation. This undesired atomization takes place at the inlet end of the ejection orifice or channel as a result of the fact that the liquid supplied to the bowl-shaped chamber of the wheel in this place rotates more slowly than the wheel itself, so that a liquid layer flowing rearwardly relative to the movement of the side wall is formed.

By means of the design suggested according to the invention, it is avoided that the liquid is atomized at the leading edge relative to the direction of rotation at the inlet to the ejection orifice. Instead, substantially all the liquid will be guided through said inlet passage to the ejection orifice in a flow which is not atomized until at the outlet edges of the ejection orifice on the external side of the atomizer wheel.

Experiments have shown that by means of an atomizer wheel according to the invention, a significantly increased powder bulk density may be obtained by atomization of liquids of the kind which will otherwise have a tendency to yield a voluminous powder product with a too low specific gravity, a considerable improvement being obtained already by means of a liquid inlet passage, the leading walls of which are normal to the direction of rotation.

In an embodiment of the atomizer wheel according to the invention, the protrusion around the leading edge of each ejection orifice is formed by a bushing inserted in the orifice and projecting inwardly from the inner side of the side wall, said inlet passage being formed as a slit at the rear side of the bushing relative to the direction of rotation, the central plane of said slit lying within an angular range of ±90° around the direction opposite to said direction of rotation. Preferably, the bottom of the slit coincides substantially with the inner side of the side wall.

In the following, the invention will be explained in further detail with reference to the accompanying schematical drawings, in which FIG. 1 is a sectional view of an embodiment of an atomizer wheel according to the invention along an axial plane, FIG. 2 is a partial radial sectional view along the line II—II in FIG. 1, and FIG. 3 shows a part of the side wall of the atomizer wheel around an ejection orifice seen from the interior of the wheel.

In the schematical drawings, FIG. 1 is an axial sectional view of an atomizer wheel having a hub 1, which for arrangement on a rotating drive shaft, not shown, is formed with an axial bore 2, together with a wheel bottom 3 and a cylindrical side wall 4. In the embodiment shown, the hub 1, the wheel bottom 3 and the side wall 4 are formed in one piece, but they may also consist of separate parts firmly connected with each other. The three parts define together a bowl-shaped liquid supply chamber 5 limited upwardly by a wheel cover 6 which is secured to the side wall 4 by means of bolts 7 and a sealing ring 8, and in which a central opening 9 is intended for connection to a non-illustrated inlet, such as a funnel-shaped inlet, for liquid to be atomized.

In the side wall 4, at least one row of ejection orifices is formed. Only one such orifice is shown in the drawings in solid lines, the rest being shown schematically in chain lines for the sake of simplicity. In the example shown, each ejection orifice is formed by a relatively narrow channel 10 in a bushing 11 inserted in a bore 12 in the side wall 4.

As shown in FIGS. 1 and 2, the side wall 4 is formed at its external side around the bore 12 with a collar 13 as abutment for a shoulder part 14 of the bushing 11, and between the bushing 11 and the bore 12 an O-ring 15 is inserted for sealing.

As further illustrated, the bushing 11 projects a distance inwardly of the inner side of the side wall 4 and is formed in the end facing the interior of the atomizer wheel with a slit 16 leading from the channel 10 to the circumference of the bushing.

In the embodiment shown, the slit is linear and directed opposite to the direction of rotation. However, as apparent from the following examples, a considerable effect will be obtained when the central plane of the slit is lying simply within an angular range of ±90° around the direction opposite to the direction of rotation. Similarly, the slit need not necessarily have a width corresponding to the diameter of the ejection channel 10 throughout its length, but may also be formed as a circular sector having a width increasing towards the circumference of the bushing, so as to form a wedge-shaped inlet passage.

The purpose of the slit 16 is to form a liquid inlet passage to the ejection channel 10 and, as shown in the drawing, the bushing 11 is arranged in the bore 12 in such a way that this inlet passage formed by the slit 16 extends rearwardly from the channel 10 relatively to the direction of rotation of the atomizer wheel shown by an arrow 17.

Thereby, the liquid layer 18 indicated symbolically in FIGS. 1 and 2, which during rotation of the atomizer wheel is built up at the side wall 4 and is not accelerated to rotation at quite the same tangential velocity as the side wall 4, so that it flows rearwardly relative thereto, will be forced by the leading edge of the end of the bushing 11 projecting inwardly from the side wall relative to the direction of rotation around the ejection channel 10, as shown by arrows 19 in FIG. 3, to the rear side of the bushing 11, at which the slit 16 is formed with a depth such that the bottom thereof coincides substantially with the inner side of the side wall 4.

Thereby, the undesired atomization at the leading edge of the ejection orifice at the inner side of the side wall mentioned in the foregoing and the occlusion of air in the liquid caused by this atomization is avoided, whereby the amount of air in the atomized product will be considerably reduced.

Since the invention is not in the first place directed to the atomization of suspension of heavily abrasive products, but primarily to the atomization of solutions, particularly great requirements to wearing strength should not be fulfilled by the bushing 11. It may be manufactured, for example, from stainless steel.

The invention is not limited to the embodiment shown in the drawings, in which the ejection orifices are formed by channels in separate bushings inserted into bores in the side wall of the wheel. To achieve the flow of liquid to the ejection orifice through an inlet passage at the rear side of the orifice characteristic for the invention, it is only required that a protrusion is provided at the inner side of the side wall around the leading edge of each ejection orifice relative to the direction of rotation for guiding the rearwardly flowing liquid layer around the leading edge of the ejection orifice to a liquid inlet passage at the rear edge of the ejection orifice relative to the direction of rotation.

In principle, such a protrusion may be constituted, for example, by a collar projecting from the inner side of the side wall, but the embodiment shown having a separate bushing inserted into a bore in the side wall will normally be preferred in practice, since it is simple and inexpensive in manufacture.

EXAMPLE 1

In a drying chamber having a diameter of 2.2 m, experiments were conducted with spray drying of a chrome tanning solution.

The drying air was introduced in the upper part of the drying chamber at a temperature of 270° C. The outlet temperature was 100° C. The solution was supplied to an atomizer wheel of the same design as shown in FIG. 1. The diameter of the wheel was 120 mms, and the diameter of the ejection channels of the bushings was 4 mms. The depth of the slit was equal to the distance, by which the bushing projected inwardly of the inner side wall, i.e. 4 mms. The rotational velocity of the wheel was 24,000 r.p.m.

The bulk density of the powder produced by the drying was measured in the normal way by tapping 100 times and was 0.89 g. per ml.

A similar experiment was conducted with a conventional atomizer wheel having the same diameter, but comprising radial ejection channels. All other operational conditions were unchanged. Thereby, a powder was obtained having a bulk density measured in the same way of 0.74 g. per ml.

EXAMPLE 2

Experiments were conducted with spray drying of a solution of a reactive dye.

The diameter of the drying chamber was 2.7 m. The drying air was introduced in the upper part of the drying chamber at a temperature of 230° C. The outlet temperature was 125° C. The solution was supplied to an atomizer wheel according to the invention of the same design as in Example 1. The rotational velocity of the wheel was 13,000 r.p.m.

Thereby, a bulk density of the produced powder of 0.68 g. per ml. was obtained.

Control experiments under the same conditions, but with a conventional atomizer wheel resulted in a bulk density of 0.54 g. per ml.

EXAMPLE 3

Four experiments were conducted with spray-drying of sulphite waste liquor.

The diameter of the drying chamber was 2.2 m. The drying air was introduced in the upper part of the drying chamber at a temperature of 230° C. The outlet temperature was 100° C. The solution was supplied to an atomizer wheel according to the invention of the same design as in Example 1. The rotational velocity of the wheel was 19,000 r.p.m.

In a first experiment (A), the slit in the bushing was directed rearwardly relative to the rotational direction of the atomizer wheel, such as shown in FIG. 1. In a second experiment (B), the bushings had been turned through 90°, so that the slit was directed upwardly. In a third experiment (C), the bushings had been turned through 90° the opposite way, so that the slit was directed downwardly. In a fourth experiment (D), the bushings had been turned through 180°, so that the slit was directed forwardly relative to the direction of rotation.

In each experiment, the bulk density obtained was measured. The results were as follows:

| Experiment | Slit | Bulk density |
|---|---|---|
| A | rearwardly | 0.52 g. per ml. |
| B | upwardly | 0.47 g. per ml. |
| C | downwardly | 0.48 g. per ml. |
| D | forwardly | 0.39 g. per ml |

What is claimed is:

1. An atomizer wheel for the atomization of liquids, comprising: a hub for connection to a rotating drive shaft, a wheel bottom connected to said hub, and a cylindrical side wall connected to said wheel bottom and forming together with the wheel bottom and the hub a bowl-shaped liquid supply chamber, a wheel cover connected to said side wall for upwardly limiting said chamber, an inlet in said wheel cover for liquid to be atomized communicating with the upper part of said liquid-supply chamber, at least one row of ejection orifices for atomizing liquid formed in said side wall, and a protrusion formed at the inner side of the side wall around a leading edge of each ejection orifice relative to the direction of rotation of said wheel for guiding a liquid layer flowing backwardly relative to the side wall around said leading edge and along the surface of the side wall between the ejection orifice and said wheel bottom or wheel cover to a liquid inlet passage of the ejection orifice facing backwardly relative to said direction of rotation.

2. An atomizer wheel as claimed in claim 1, wherein the protrusion around the leading edge of each ejection orifice is formed by a bushing inserted in the orifice and projecting inwardly from the inner side of the side wall, said inlet passage being formed as a slit at the rear side of the bushing relative to the direction of rotation, the central plane of said slit lying within an angular range of ±90° around the direction opposite to said direction of rotation.

3. An atomizer wheel as claimed in claim 2, wherein the bottom of said slit coincides substantially with the inner side of the side wall.

* * * * *